United States Patent [19]

Ryu

[11] Patent Number: 4,663,768
[45] Date of Patent: May 5, 1987

[54] DIVERSITY SYSTEM OF SELECTION TYPE EQUIPPED WITH A CODE CORRECTION/SWITCH CIRCUIT FOR RECEIVING A PSK OR QAM WAVE CARRYING DIFFERENTIALLY ENCODED SIGNAL

[75] Inventor: Toshihiko Ryu, Tokyo, Japan

[73] Assignee: NEC Corporation, Tokyo, Japan

[21] Appl. No.: 720,221

[22] Filed: Apr. 5, 1985

[30] Foreign Application Priority Data

Apr. 6, 1984 [JP] Japan ................................. 59-67349

[51] Int. Cl.⁴ .............................................. H04L 1/06
[52] U.S. Cl. ..................................... 375/100; 375/40; 375/84; 455/133; 371/68
[58] Field of Search .............................. 455/133–136, 455/277, 52; 375/40, 100, 56, 84, 85, 53, 102; 371/56, 68

[56] References Cited

U.S. PATENT DOCUMENTS

| | | | |
|---|---|---|---|
| 3,628,149 | 12/1971 | Swan | 375/40 |
| 4,246,656 | 1/1981 | Wood et al. | 375/100 |
| 4,349,914 | 9/1982 | Evans | 375/100 |
| 4,506,385 | 3/1985 | Fedde et al. | 375/100 |
| 4,530,087 | 7/1985 | Yamamoto | 375/40 |
| 4,615,040 | 9/1986 | Mojoli et al. | 375/40 |

Primary Examiner—Benedict V. Safourek
Assistant Examiner—M. Huseman
Attorney, Agent, or Firm—Sughrue, Mion, Zinn, Macpeak, and Seas

[57] ABSTRACT

A diversity system of the selection type for correcting phase ambiguities among a plurality of differentially encoded digital signals while retaining the digital encoding of those signals. With this system, no differential decoding/encoding means are needed in relay units of the system. Thus, differentially encoded digital signals may be sent through relay systems containing error correcting MODEMs without the additional complication of differential decoding/encoding circuitry.

10 Claims, 5 Drawing Figures

DIVERSITY SYSTEM OF SELECTION TYPE EQUIPPED WITH A CODE CORRECTION/SWITCH CIRCUIT FOR RECEIVING A PSK OR QAM WAVE CARRYING DIFFERENTIALLY ENCODED SIGNAL

BACKGROUND OF THE INVENTION

The present invention relates to a diversity system of the selection type for receiving and demodulating with a plurality of receiver sections a multi-phase PSK (phase shift keying) or multi-level QAM (quadrature amplitude modulation) wave carrying differentially encoded signals, and for selecting the signals with the lowest bit error rate (BER) out of the demodulated signals.

A radio digital signal transmission system usually consists of a first terminal station, a relay station and a second terminal station sequentially connected from one to another. At the first terminal station, digital signals are differentially encoded by a differential encoder and supplied to, for instance, a PSK or QAM modulator, which modulates a carrier for transmission. At the relay station, the PSK or QAM wave is received and demodulated by a demodulator, and differentially decoded by a differential decoder to recover the original digital signals. The recovered digital signals are processed in the same manner as in the aforementioned transmission from the first terminal station, and modulated and transmitted to the second terminal station, where the digital signals are recovered in the same manner as in the aforementioned reception at the relay station.

In such radio digital transmission setups, space or frequency diversity systems are generally used to increase the reliability of the transmission channel against fading or the like. Among such diversity systems, so-called selection type diversity systems are frequently used, wherein the signals with the lowest BER are selected out of baseband signals demodulated by N ($\geq 2$, usually 2) receivers.

Such diversity systems are complex in structure since each system has pluralities of receivers, demodulators and differential decoders, the differential decoders particularly complicating the structure.

Further, whereas differential encoders and decoders are used to eliminate the phase ambiguity of the carrier wave generated by a demodulator, they may be unusable in specific cases, where for example an error-correcting MODEM (modulator/demodulator) is employed.

SUMMARY OF THE INVENTION

An object of the present invention is to provide a diversity system of the selection type dispensing with differential decoders in the relay station.

According to the invention, there is provided a diversity system of the selection type comprising N ($\geq 2$) receiver means for receiving multi-phase PSK or multi-level QAM waves carrying differentially modulo-M (equal to or more than 2) encoded digital signals and providing N sequences of demodulated digital signals by phase-detecting the waves with a recovered carrier wave, and selector means for selecting out of the N sequences of demodulated digital signals one with a low bit error rate, which further includes first means for aligning said selected one of the sequence of demodulated digital signals with other sequences of demodulated digital signals, thereby providing a demodulated digital signal sequence retaining said differential encoding as the output of the selector means.

DETAILED DESCRIPTION OF THE INVENTION

Figures 1, 2:
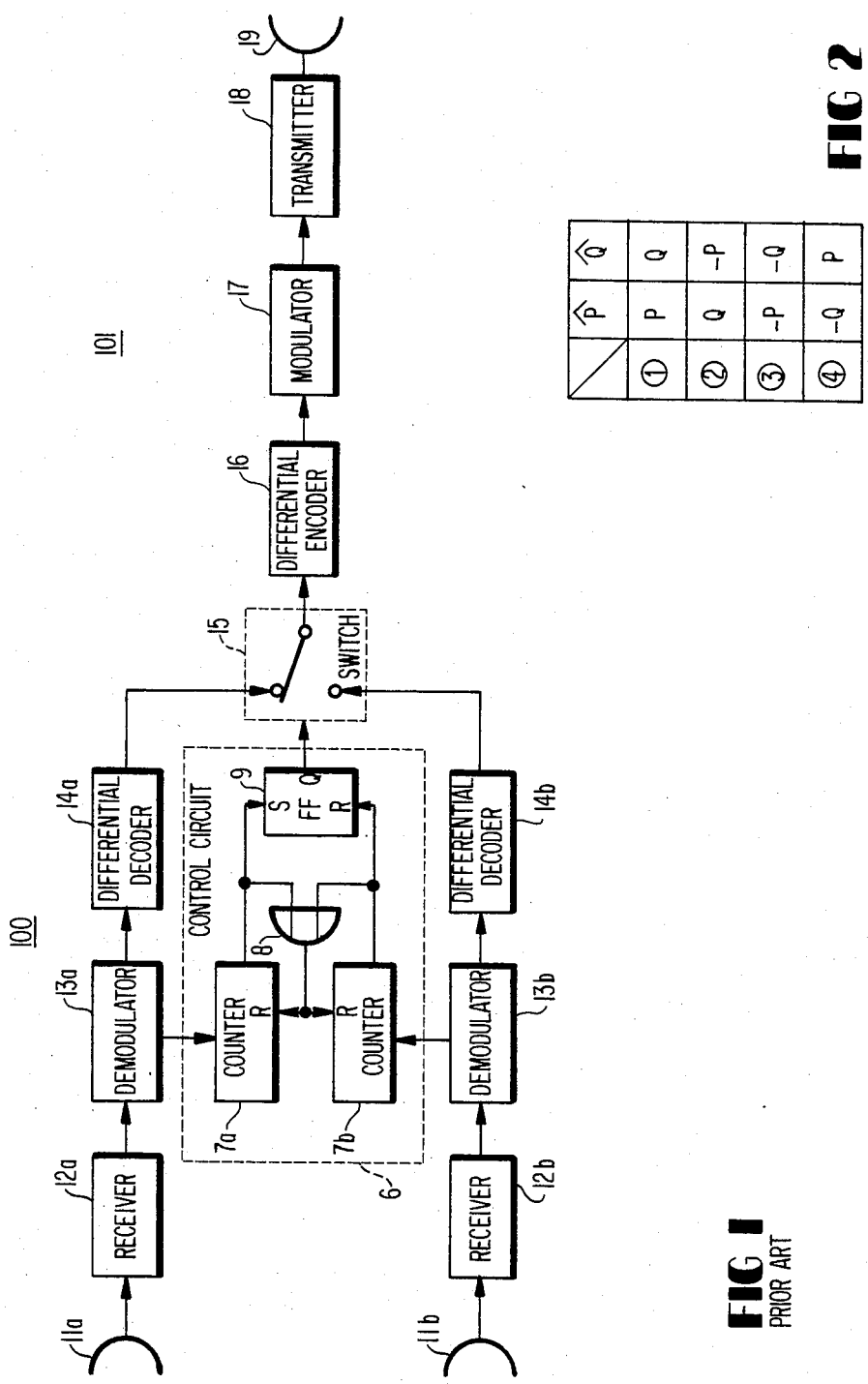
FIG. 1 is a block diagram illustrating an example of an intermediate relay station structure using a prior art space diversity system of selection type.
FIG. 2 is a diagram showing the encoding of codes which are to be differentially encoded.

FIG. 1 is a block diagram illustrating an example of an intermediate relay station structure arranged between terminal stations and, moreover, using a conventional space diversity system of the selection type. Referring to the figure, the relay station consists of a receiver section 100 and a transmitter section 101. The receiver section 100 comprises a control circuit 6, antennas 11a and 11b, receivers 12a and 12b, demodulators 13a and 13b, differential decoders 14a and 14b, and a switch 15. The control circuit 6 further consists of counters 7a and 7b, an OR gate 8 and an SR (set/reset) flipflop 9. The transmitter section 101 consists of a differential encoder 16, a modulator 17, a transmitter 18 and an antenna 19.

The multi-phase PSK or multi-level QAM waves carrying digital signals having undergone modulo-M ($\geq 2$) differential encoding, which are transmitted from a terminal station (not shown), are respectively picked up by the antennas 11a and 11b, frequency converted by the receivers 12a and 12b, and supplied to the demodulators 13a and 13b. Each of the demodulators 13a and 13b, as is known to those skilled in the art, is composed of a carrier recovery circuit, a clock recovery circuit, a coherent detector for detecting the PSK or QAM wave according to the recovered carrier wave, and a discriminator circuit for level-discriminating the output of the coherent detector with the recovered clock and providing demodulated digital signals. The outputs of these demodulators 13a and 13b, i.e., those of the discriminator circuits, are respectively supplied to the differential decoders 14a and 14b to be decoded into the original digital signals. The demodulators 13a and 13b each include a bit error detector (not shown). For details on these bit error detectors, reference may be made to the U.S. Pat. No. 4,188,615, assigned to NEC corporation and issued on Feb. 12, 1980.

The outputs of these bit error detectors are supplied to the control circuit 6, which generates a control signal for selecting, out of the signals demodulated by the demodulators 13a and 13b, those with a lower BER. In this control circuit 6, the counters 7a and 7b count bit error signals, and upon having counted them up, set or reset the SR flipflop 9 and at the same time reset both counters 7a and 7b through the OR gate 8. The output of the flipflop 9 actuates the switch 15 to select the output of the differential encoder whose BER is lower.

In the receiving section 101, the digital signals selected by the switch 15 are differentially encoded by the differential encoder 16, and supplied to the modulator 17 which provides PSK waves. The PSK waves are frequency converted by the transmitter 18 and transmitted to another relay station or terminal station (not shown) from the antenna 19. For details on such a space diversity system, reference may be made to Yamazaki et al., "2 GHz Digital Radio-Relay System", IEEE International Conference on Communication, Vol. 1, pp. 5.5.1–5.5.5, 1979.

In the foregoing relay station, the problems of phase ambiguity that might otherwise arise in the carrier wave recovered by the demodulators 13a and 13b is solved by the use of the differential decoders 14a and 14b and the differential encoder 16. However, these encoders and decoders are too complex and, moreover, they may be unsuitable for use in a MODEM for error correction.

Figure 3:
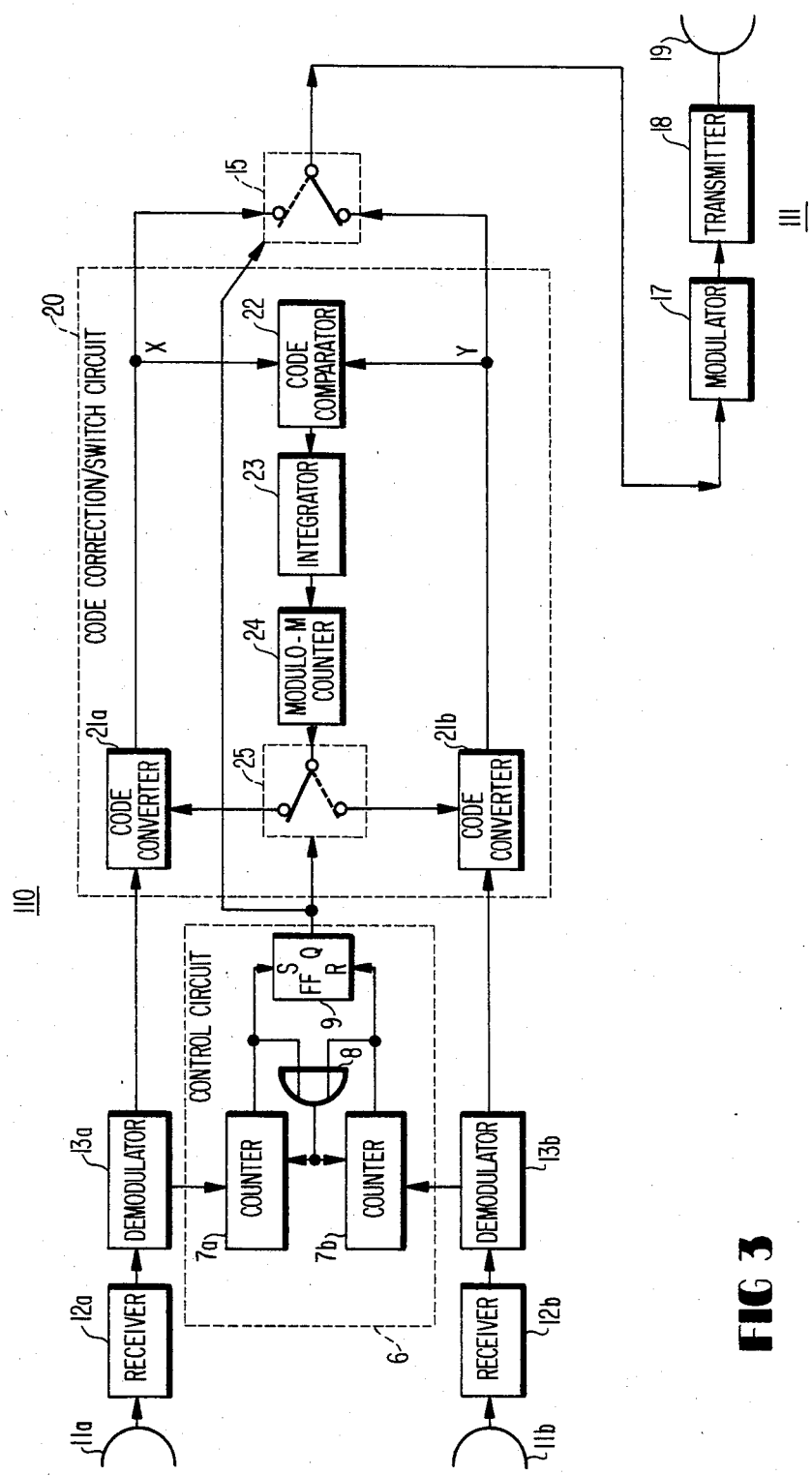
FIG. 3 illustrates an intermediate relay station structure to which is applied a diversity system including a code correction/switch circuit according to the present invention.

A feature of the present invention resides in the use of a simply structured code correction/switch circuit instead of the aforementioned decoders and encoder. A preferred embodiment of the invention is illustrated in FIG. 3.

Before describing the preferred embodiment of FIG. 3, the phase ambguity that might arise in the carrier wave recovered by the demodulators 13a and 13b will be explained.

Generally, there is M-phase ($M \geq 2$) ambiguity in an M-phase PSK modulation system, or four phase ambiguity in a multi-level QAM modulation system. Whereas modulo-M differential encoding is required for M-phase ambiguity, an instance of M=4 will be taken up for the following explanation because the principle is the same with any number of phase ambiguity.

Where characters P and Q represent the codes of two sequences of demodulated data from one of two demodulators at the same point of time to be differentially encoded and $\hat{P}$ and $\hat{Q}$, those of data sequences from the other, $\hat{P}$ and $\hat{Q}$ are expressed by P and Q, as shown in FIG. 2. As is evident from this figure, if the codes $\hat{P}$ and $\hat{Q}$ can be always made identical to the codes P and Q irrespective of whichever of the conditions ① to ④, switching (selection) at the intermediate relay station will be made possible without losing the differential encoding function, and the complex differential decoders and encoders will be dispensed with. The code coincidence is readily carried out by repeating the process comprising the following steps: (1) comparing P and $\hat{P}$ (or Q and $\hat{Q}$), (2) actuating a modulo-4 (modulo M) counter in response to the comparing output, and (3) converting $\hat{P}$ and $\hat{Q}$ in the input conditions of ① to ④ into P and Q in response to the counter output. Accordingly, at most four repetitions of the process can cause $\hat{P}$ and $\hat{Q}$ to coincide with P and Q. Where the modulus is M, exactly the same result can be achieved if there are provided a code-converter for M input conditions and a modulo-M counter.

FIG. 3 illustrates an intermediate relay station in which is used a diversity system including a code correction/switch circuit according to the present invention. The same constituent elements as in FIG. 1 are represented by respectively the same reference numerals. The relay station of FIG. 3 relays the M (=4)—phase PSK or multi-level QAM waves carrying the differentially modulo-M (=4) encoded digital signals, and consists of a receiver section 110 and a transmitter section 111. The receiver section 110 includes a code correction/switch circuit 20, which is a characteristic feature of the present invention. The circuit 20 comprises code converters 21a and 21b, a code comparator 22, an integrator 23, a modulo-4 counter 24 and a switch 25.

The outputs of two demodulators 13a and 13b are respectively connected to the code converters 21a and 21b for four conditions to be described in detail afterwards. Phase ambiguity is detected by the code comparator 22 on the basis of differences between code sequences X and Y, and the detection output is determined by the integrator 23 to be either a simple code error or a disparity due to a phase ambiguity, the determination output further actuating the modulo-4 counter 24. The output of the modulo-4 counter 24 is switch-connected to the code converters 21a and 21b via the switch 25, which, as is evident from the figure, is turned in a reverse position to the switch 15. In other words, the phase ambiguity is so corrected as to bring into coincidence with the currently selected code sequence the other code sequence, so that continuous data can be provided from the output of the switch 15, irrespective of the position of the switch 15. Incidentally, the positions of the switches 15 and 25 in FIG. 3 represent a case in which the output of the demodulator 13a is higher in BER than that of the demodulator 13b.

Now will be described in further detail this code correction/switch circuit 20 with reference to FIGS. 4 and 5.

Figure 4:
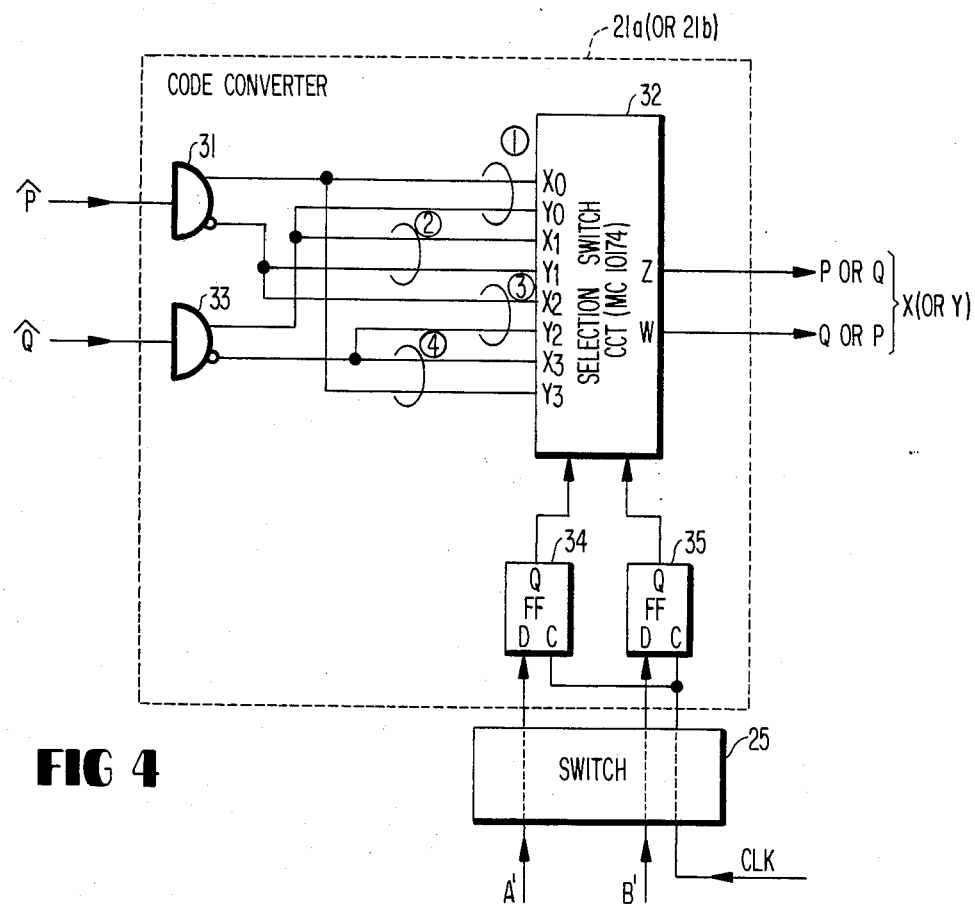
FIG. 4 is a diagram primarily showing a typical structure of the code converter of FIG. 3, wherein M is 4.

FIG. 4 illustrates an example of the code converter 21a (or 21b) of FIG. 3 where M is 4. Referring to the figure, the converter 21a or 21b comprises gates 31 and 33 for outputting normal and reverse phases, respectively, a selection switch circuit 32 and flipflops 34 and 35. The outputs P and Q of the demodulator 13a (or 13b) are supplied to the gates 31 and 33, and converted into the four pairs of codes ① to ④, i.e., (P, Q), (Q, −P), (−P, −Q) and (−Q, P), as shown in FIG. 2. The selection switch circuit 32, which may be Motorola's MC 10174 for instance, selects one of the four code pairs in accordance with the outputs of the flipflops 34 and 35. The selecting process is continued until the outputs of the two code converters 21a and 21b coincide with each other. These flipflops 34 and 35 read the outputs A' and B' of the modulo-4 counter 24 in response to a clock pulse CLK from a clock recovery circuit in the demodulator 13a or 13b. The switch 25 switches both the clock pulse CLK and the output of the counter 24. Accordingly, if switch 25 is connected as represented by the solid line in FIG. 3, the flipflops 34 and 35 in the code converter 21a which is subject to code correction read and retain the output of the counter 24 bit by bit in response to the clock pulse CLK. Meanwhile, the flipflops of the code converter 21b, not subject to code correction, are supplied with neither the clock pulse PSK nor the output of the counter 24, and accordingly retain the output of the counter 24 before switching by the switch 25. Therefore, only the selection switch circuit 32 of the code converter subject to code correction is actuated by the output of the counter 24.

Figure 5:
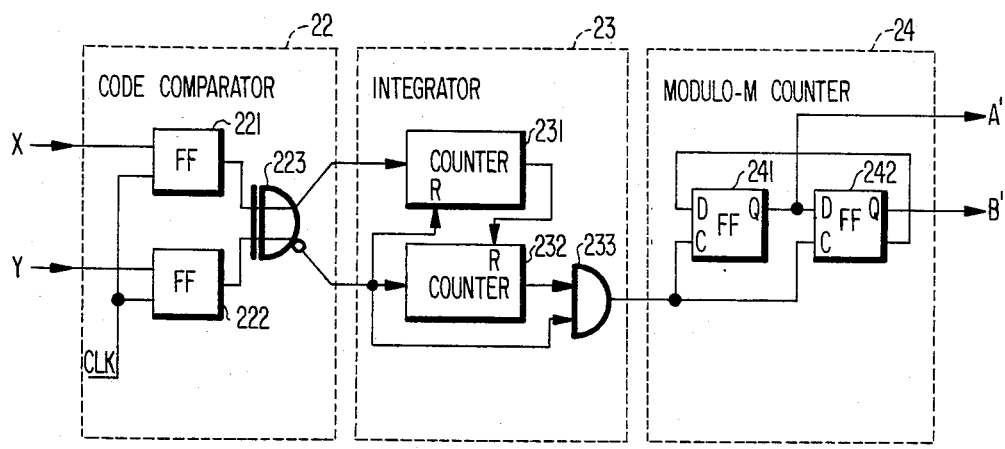
FIG. 5 illustrates a typical structure of the code comparator, integrator and modulo-M (=4) counter of FIG. 3.

FIG. 5 illustrates an example of specific circuitry of the code comparator 22, integrator 23 and counter 24. Referring to FIG. 5, the outputs X and Y of the code converters 21a and 21b in FIG. 3 or 4 are supplied to the code comparator 22. Although the outputs X and Y, as is evident from FIG. 4, consists of two sequences each when M is 4, only one of the two sequences is used in the embodiment of FIG. 5 to simplify the code comparator 22. The outputs X and Y are read by flipflops 221 and 222 of the code comparator 22 in accordance with the aforementioned clock pulse CLK, and their coincidence or non-coincidence is determined by an Exclusive-OR/NOR gate 223. A coincidence signal is supplied to a counter 231 of the integrator 23, while a non-coincidence signal is fed to a counter 232 of same.

If the outputs X and Y continue to coincide with each other for a certain length of time, the output of the counter 231 will rise to a high level to reset the counter 232, whose output will then descend to a low level to reduce in turn the output of an AND gate 233 to a low level. Thus, the AND gate 233 will be closed. Therefore, the outputs of D-flipflops 241 and 242 which constitute the modulo-4 counter 24 will remain unchanged.

However, if the outputs X and Y fail to coincide with each other just once, the counter 231 will be reset. If they continue to be non-coincident for a certain length of time, the output of the counter 232 will rise to a high level to open the gate 233, and the non-coincidence signal fed to the other input terminal will pass the gate 233 to alter the outputs A' and B' of the flipflops 241 and 241 cyclically. These outputs A' and B' are read into the flipflops 34 and 35 via the switch 25 to sequentially select one or another of the aforementioned four code pairs ① to ④, and this process is repeated until the output X of the code converter 21a coincides with the output Y of the code converter 21b.

By keeping the output X coincident with the output Y in this manner, the switch 15 of the relay station can be turned back and forth while keeping the differential encoding function at the terminal stations preceding the relay station. As is evident from FIG. 3, the transmitter section 111 requires nothing like the encoder 16 in FIG. 1.

As hitherto described, the present invention makes it possible to consecutively switch on (select), as desired, one of plural reception systems among N reception systems having M phase ambiguities. Moreover, since only phase ambiguities are corrected without losing the differential encoding function, differential decoders and differential encoders, which would complicate the structure, can be dispensed with. Therefore, even where no differential decoder or differential encoder at the relay station can be used, differential encoding at the terminal station is made possible, and the hardware structure can be relatively simplified.

What is claimed is:

1. A diversity system of the selection type comprising N (equal to or more than 2) receiver means for receiving multi-phase PSK or multi-level QAM waves carrying a differentially modulo-M (equal to or more than 2) encoded digital signal and providing N sequences of demodulated digital signals by phase-detecting said waves with a recovered carrier wave, and selector means for selecting out of said N sequences of demodulated digital signals one with a low bit error rate, which further includes first means for determining phase ambiguity between said N sequences of demodulated digital signals and aligning with the selected one of said sequences of demodulated digital signals other sequences of demodulated digital signals, wherein a demodulated digital signal sequence retaining said differentially encoded digital signal as the output of said selector means is provided.

2. A system as defined in claim 1, wherein said selector means comprises bit error rate monitor means for providing a selection signal identifying a first of said sequences as having the lower bit error rate, and switch means responsive to said selection signal for selecting said first sequence, and wherein said first means comprises comparing means for comparing said first sequence to a second of said N sequences to determine a phase ambiguity and second means responsive to said first means for converting said second sequence to the same phase as said first sequence.

3. A system as defined in claim 2, wherein said second means comprises a modulo-M counter which counts in response to output signals from said first means, and conversion means for converting said second sequence in accordance with the output of said counter.

4. A system as defined in claim 1, wherein said first means comprises:
at least first and second conversion means each receiving respective first and second ones of said N sequences and converting their respective sequences in accordance with a control signal, outputs of said conversion means being provided as inputs to said selector means;
comparison means for receiving and comparing outputs from said first and second conversion means and determining phase ambiguity therebetween;
means responsive to said comparison means for providing said control signal to the conversion means whose output is not selected by said selector means.

5. A diversity system as defined in claim 1, further comprising modulator means responsive to the output of said selector means for providing a multi-phase PSK or multi-level QAM wave carrying said differentially encoded digital signal, and transmitter means for transmitting the output of said modulator means to a remotely located station.

6. A diversity system of the selection type comprising first and second receiver means for receiving multi-phase PSK or multi-level QAM waves carrying a differentially modulo-M (equal to or more than 2) encoded digital signal and providing first and second sequences of demodulated digital signals by phase-detecting said waves with a recovered carrier wave, selector means for selecting out of said first and second sequences the sequence with a lower bit error rate, comparing means for comparing said first sequence with said second sequence to determine a phase ambiguity, and first means responsive to the output of said comparing means for converting said second sequence to the same phase as said first sequence, wherein differential encoding of received signals is retained during phase ambiguity determination.

7. A diversity system as defined in claim 6, wherein said first means comprises a modulo-M counter for counting the output of said comparing means, and conversion means for converting said second sequence in response to the output of said counter.

8. A diversity system as defined in claim 6, further comprising modulator means responsive to the output of said selector means for providing a multi-phase PSK or multi-level QAM wave carrying said differentially encoded digital signal, and transmitter means for transmitting the output of said modulator means to a remotely located station.

9. A diversity system of the selection type comprising first and second receiver means for receiving multi-phase PSK or multi-level QAM waves carrying a differentially modulo-M (equal to or more than 2) encoded digital signal and providing first and second sequences of demodulated digital signals by phase-detecting said waves with a recovered carrier wave, selector means for selecting out of said first and second sequences the sequence with a lower bit error rate, first and second conversion means for receiving the respective first and second sequences and converting their respective sequences in accordance with a control signal, comparison means for receiving and comparing the outputs of said first and second conversion means and determining phase ambiguity therebetween, means responsive to said comparison means for providing said control signal to the conversion means whose output is not selected by said selector means, wherein said conversion means provides a signal retaining said differentially encoded digital signal as the output of said selector means.

10. A diversity system as defined in claim 9, further comprising modulator means responsive to the output of said selector means for providing a multi-phase PSK or multi-level QAM wave carrying said differentially encoded digital signal, and transmitter means for transmitting the output of said modulator means to a remotely located station.

* * * * *